United States Patent [19]
Suga et al.

[11] Patent Number: 5,363,137
[45] Date of Patent: Nov. 8, 1994

[54] FOCUS ADJUSTING APPARATUS WHICH READS A SELECTED PORTION OF AN IMAGE PICKUP PLANE

[75] Inventors: Akira Suga, Tokyo; Kenichi Kondo, Kawasaki, both of Japan

[73] Assignee: Canon Kabushiki Kaisha, Tokyo, Japan

[21] Appl. No.: 177,181

[22] Filed: Jan. 3, 1994

Related U.S. Application Data

[63] Continuation of Ser. No. 802,726, Dec. 5, 1991, abandoned.

[30] Foreign Application Priority Data

Dec. 6, 1990 [JP] Japan ................. 2-400609

[51] Int. Cl.$^5$ ............................. H04N 5/232
[52] U.S. Cl. ................. 348/302; 348/304; 348/350
[58] Field of Search ............ 348/345, 350, 302, 303, 348/304

[56] References Cited

U.S. PATENT DOCUMENTS

| | | | |
|---|---|---|---|
| 4,644,405 | 2/1987 | Roy et al. | 358/213.26 |
| 4,689,686 | 8/1987 | Hashimoto et al. | 358/213.26 |
| 4,804,831 | 2/1989 | Baba et al. | 358/227 |
| 4,841,369 | 6/1989 | Nishizawa et al. | 358/213.26 |
| 4,872,058 | 10/1989 | Baba et al. | 358/227 |
| 4,994,920 | 2/1991 | Fujiwara et al. | 358/227 |
| 5,051,833 | 9/1991 | Tsuji | 358/227 |
| 5,075,777 | 12/1991 | Murata | 358/227 |
| 5,126,849 | 6/1992 | Senuma et al. | 354/402 |

OTHER PUBLICATIONS

J. Hynecek, A New Device Architecture Suitable for High–Resolution and High–Performance Image Sensors, IEEE Transactions on Electron Devices, vol. 35, No. 5, pp. 646–652 (May 1988).

*Primary Examiner*—Joseph Mancuso
*Assistant Examiner*—Wendy R. Greening
*Attorney, Agent, or Firm*—Fitzpatrick, Cella, Harper & Scinto

[57] ABSTRACT

The present invention relates to an automatic focusing apparatus for positioning a lens at the optimum focus position. The apparatus includes an image pick up element which can be accessed at any desired line, thus allowing only a predetermined portion of an image pickup plane to be read scanned. This enables plural AF scan operations to be performed at high-speed.

29 Claims, 11 Drawing Sheets

FIG. 7A PRIOR ART — IMAGE SIGNAL
FIG. 7B PRIOR ART — DIFFERENTIAL WAVEFORM D
FIG. 7C PRIOR ART — DL1
FIG. 7D PRIOR ART — DL2
FIG. 7E PRIOR ART — INTEGRAL WAVEFORM I=D+DL1+DL2
FIG. 7F PRIOR ART — ES=D/I
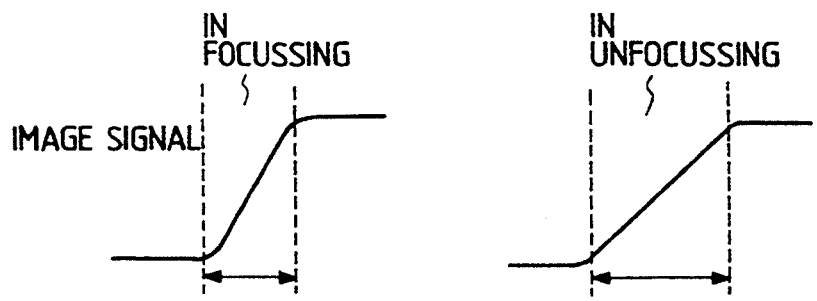
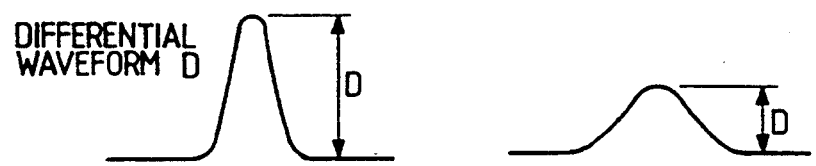
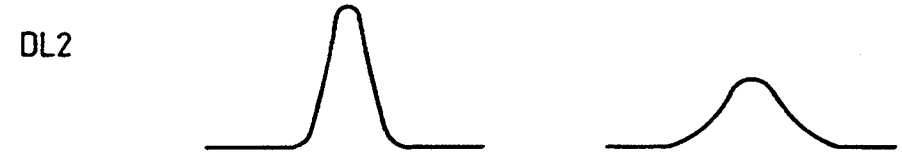
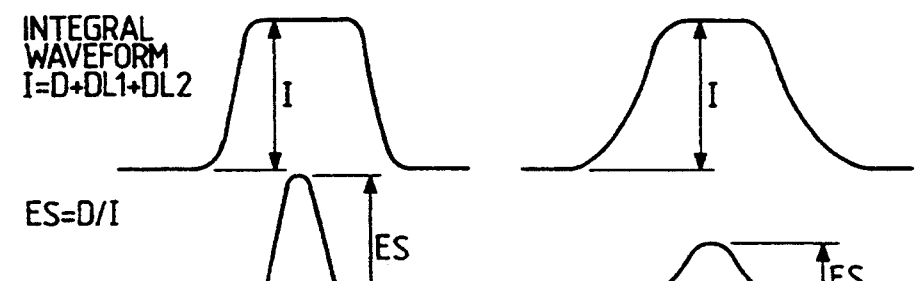
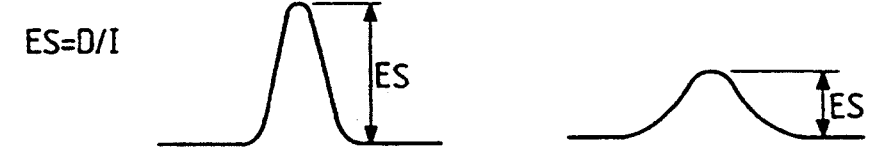

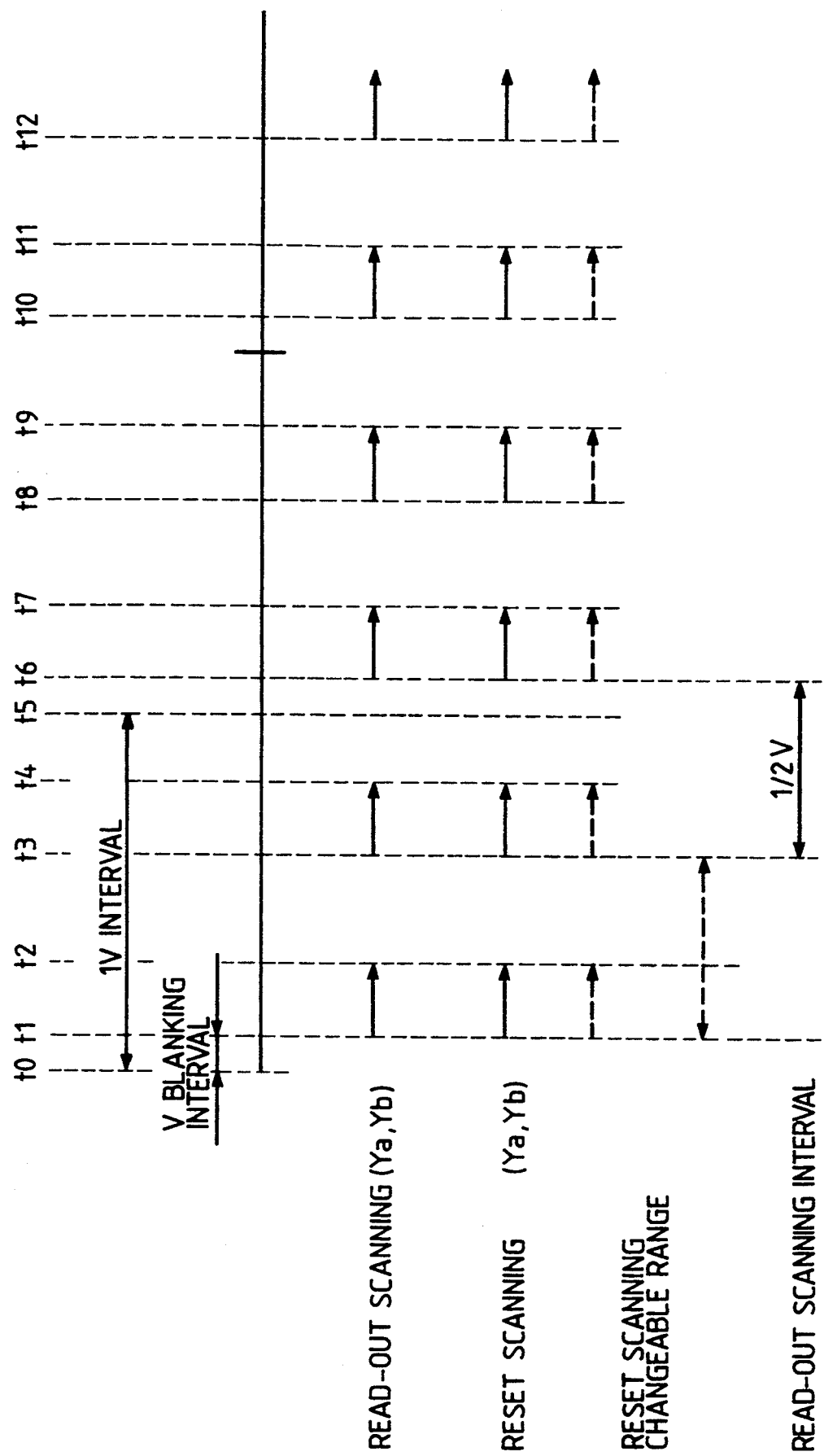

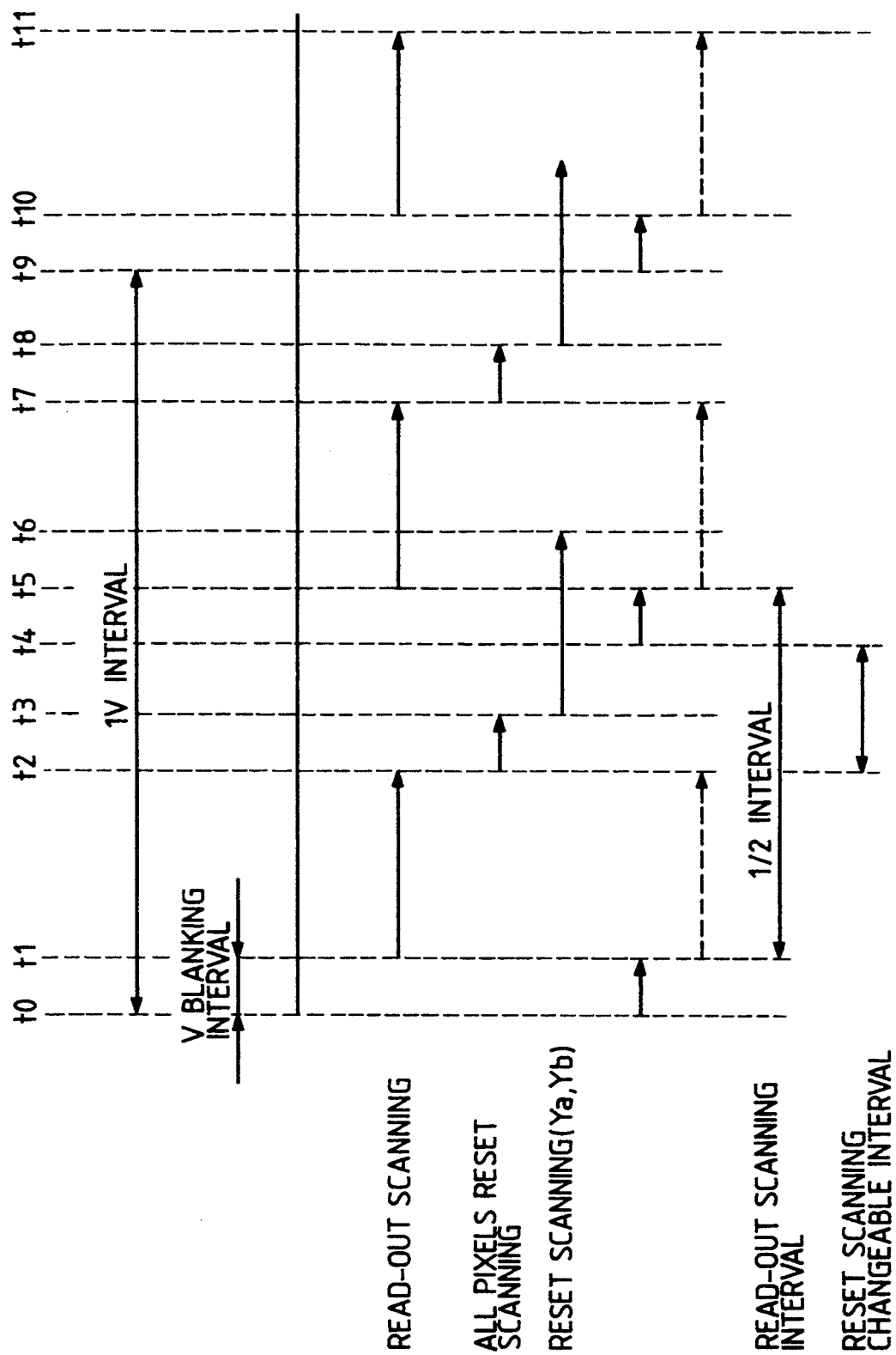

FOCUS ADJUSTING APPARATUS WHICH READS A SELECTED PORTION OF AN IMAGE PICKUP PLANE

This application is a continuation of application Ser. No. 07/802,726 filed Dec. 5, 1991, now abandoned.

BACKGROUND OF THE INVENTION

1. Field of the Invention

The present invention relates to an automatic focus adjusting (referred to as "AF" hereinafter) apparatus.

2. Related Background Art

A camera is generally provided with an automatic focus adjusting apparatus, and particularly, in recent years, a camera has necessarily been provided with an automatic focusing function.

Although there are many AF apparatus systems, video apparatus, such as video cameras, still video cameras and the like have recently remarkably been developed, a conventional AF system in which focus detected using the reflected light of an applied infrared has recently been changed to a system in which focus is detected and adjusted by determining an out-of-focus amount on the basis of the signal component which is extracted from the signal output from an image pickup element which varies depending upon a focusing state.

In such an AF system, a high-frequency component is extracted from the signal output from image pickup element, and a lens is controlled so that the high frequency level of the component is at a maximum.

In an AF apparatus, an area, i.e., a focus detecting area, from which a signal component, e.g., a high-frequency signal component, indicating a focusing state is extracted, is generally disposed on a predetermined portion near the central portion of an image plane. This focus detecting area is not provided over the whole image plane, but it is provided on a central portion of the image plane. Reasons for this are the following:

If the focus detecting area is excessively large, since the focus detecting area includes both a main subject and a background, focus cannot be detected with high precision. If the focus detecting area is excessively small, far and near competition between a main subject and a background occurs and thus makes a focusing state unstable.

Although typical recent AF systems have been described above, in these AF systems, a single focus detection requires a single vertical scanning referred to as "1 V" hereinafter) period necessary; for scanning the whole image plane because focus is detected using the signal output from an image pickup element.

However, about 12 to 13 times of scanning sometimes required for maintaining AF precision. Since a single AF scanning takes 1 V period, a about 200 ms is taken until AF scanning is completed, and a time lag at shutter release is thus increased. If an attempt is made to decrease the time lag, the number of times of AF scanning must be decreased, which produces an undesirable decrease AF precision.

There have been many prior applications concerning AF systems in which focus is adjusted on the basis of the signals output from an image pickup element or on the basis of signals from the focus detecting area provided on an image plane. Main examples of prior U.S. applications include the following:

(1) U.S. Ser. No. 17183 filed on Feb. 19, 1987, now abandoned (2) U.S. Pat. No. 4,994,920

(3) U.S. Pat. Ser. No. 240,915 filed on Sep. 6, 1988

(4) U.S. Ser. No. 154,078 filed on Feb. 9, 1988, now abandoned

However, there is no application concerning an AF system in which focus is adjusted by rapidly (within 1 V) reading only a portion of the image plane of an image pickup element. In any one of the AF systems, since a gate is applied to the image signals output at 1 V intervals, and only the signals within the focus detecting area are extracted, AF information can be obtained only on the 1 V unit, and an attempt cannot be made to increase the AF speed.

SUMMARY OF THE INVENTION

The present invention has been achieved under the above-described circumstances, and it is an object of the invention to provide a focus adjusting apparatus which is capable of decreasing a release time lag, without decreasing AF precision.

In order to achieve the object, a focus adjusting apparatus according to a preferred embodiment of the present invention comprises an image pickup element which can read only a desired region on an image plane, reading means for reading image information by rapidly scanning the focus detecting area provided on the image plane of the image pickup element, and focus detecting means for detecting focus on the basis of the output from the reading means.

In another preferred embodiment of the invention, a focus adjusting apparatus for adjusting focus to a position where an image has the smallest out-of-focus amount detected from the signals read reversal times from an image pickup element which can vertically access any desired scanning line, while changing focus conditions, comprises reset scanning means for reset scanning of scanning lines corresponding to a vertical region of a distance measuring frame, read scanning means for read scanning of the scanning lines after a predetermined time has passed since the reset scanning, and focus adjusting means for adjusting focus on the basis of the output from the read scanning means.

It is another object of the invention to provide a video camera which is capable of increasing AF precision and keeping release time lag to a minimum, because AF scanning information can be obtained many times during a short period, and which is capable of preventing error from occurring due to blooming.

The other objects and characteristics of the present invention will be made apparent from the description below and the attached drawings.

BRIEF DESCRIPTION OF THE DRAWINGS

FIGS. 7A to 7F are drawings explaining an ES (edge sharpness) method;

FIG. 11 is a drawing showing an AF scanning method in the first embodiment;

FIG. 13 is a drawing showing an AF scanning method in the second embodiment.

DETAILED DESCRIPTION OF THE PREFERRED EMBODIMENTS

A focus adjusting apparatus of the present invention is described below with reference to embodiment.

Figure 1:
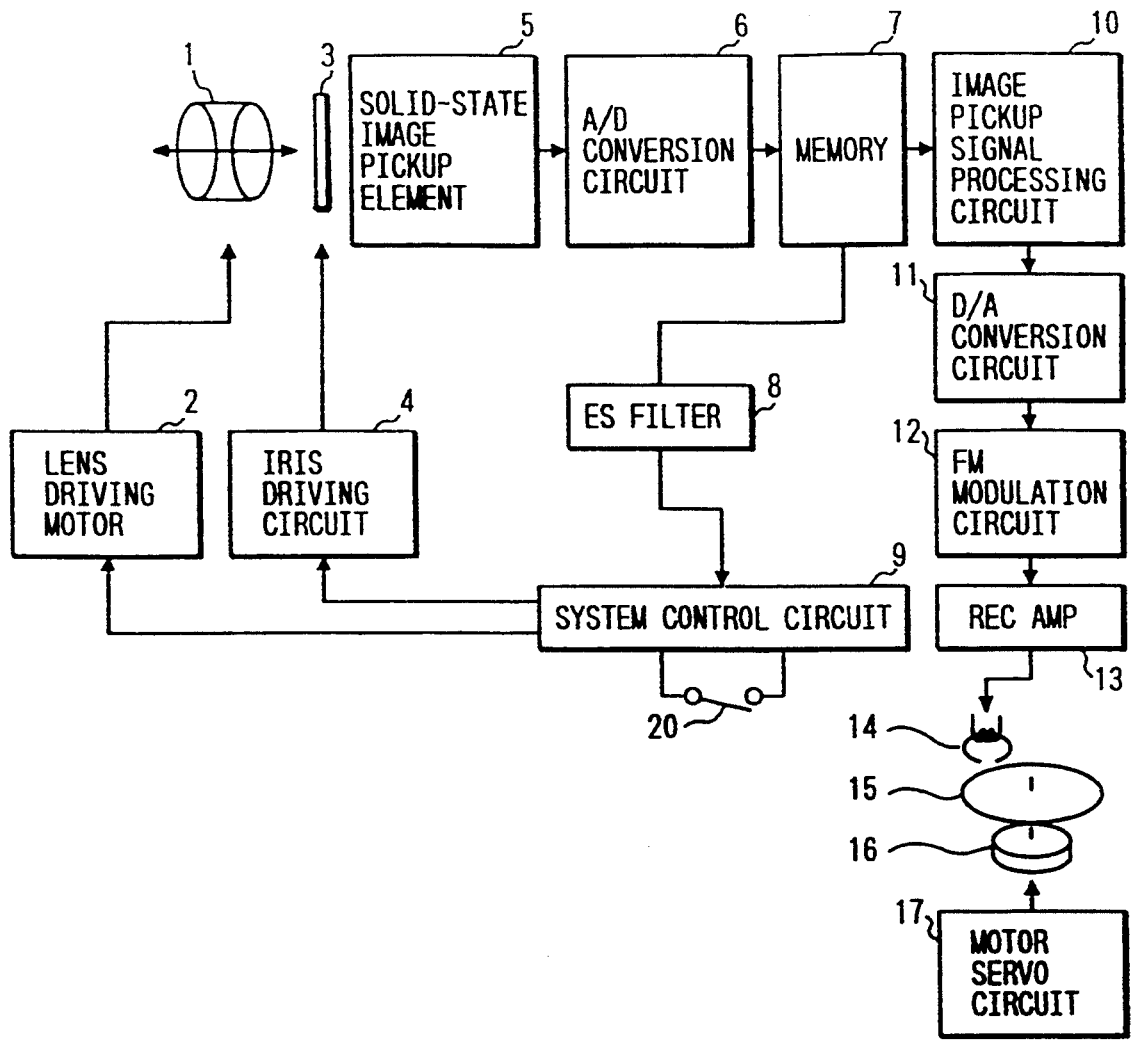
FIG. 1 is a block diagram of a conventional still video camera with an AF function.

FIG. 1 is a block diagram of a still video camera with an AF function having the function to detect an out-of-focus amount of an image from the output from a solid-state image pickup element for imaging the subject. In FIG. 1, reference numeral 1 denotes a lens unit; reference numeral 2, a lens driving motor; reference numeral 3, an aperture; and reference numeral 4, an iris driving circuit. Reference numeral 5 denotes a solid-state image pickup element which converts an optical image of a subject into electrical signals and which is capable of specifying, resetting and reading any desired line in the vertical direction. Reference numeral 6 denotes an A/D (analog-digital) conversion circuit for A/D conversion of the output of the solid-state image pickup element. Reference numeral 7 denotes a field memory for storing the output of the A/D conversion circuit 6, and reference numeral 8 denotes an ES filter for calculating an ES value (described below) indicating an out-of-focus amount. Reference numeral 9 denotes a system control circuit for controlling the whole system, and reference numeral 10 denotes an image pickup signal processing circuit for processing such as γ conversion, band limitation and the like of the output from the memory 7. Reference numeral 11 denotes a D/A (digital-analog) conversion circuit for D/A conversion of the output from the image pickup signal processing circuit 10. Reference numeral 12 denotes an FM modulation circuit for FM modulation of the output from the D/A conversion circuit 11. Reference numeral 13 denotes an REC (recording) amplifier for current amplification of the output from the FM modulation circuit 12. Reference numeral 14 denotes a head; reference numeral 15, a magnetic sheet serving as a recording medium; reference numeral 16, a motor for rotating the magnetic sheet 15; and reference numeral 17, a motor servo circuit for stabilizing the rotation of the motor 16. Reference numeral 20 denotes a release switch. When the switch 20 is turned on, a series of photographing operations are started.

Figure 3:
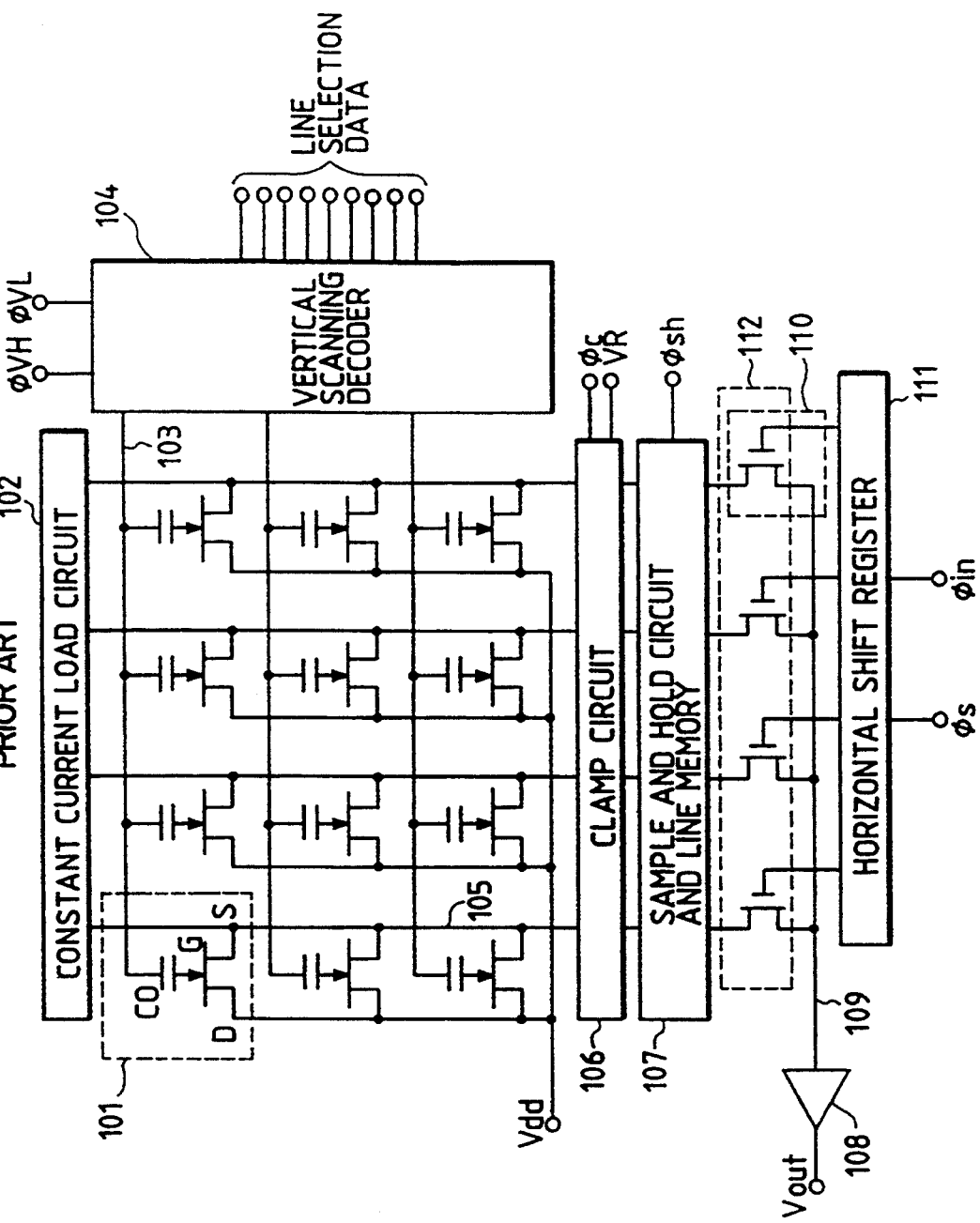
FIG. 3 is a drawing showing the arrangement of an FGA (floating gate array) solid-state image pickup element and the driving circuit thereof.

FIG. 3 shows an example of the arrangement of the solid-state image pickup element 5 which is capable of specifying, resetting and reading any desired line in the vertical direction. This example has a structure called FGA (floating gate array). Because such an FGA solid-state image pickup element is described in detail in a published document (IEEE TRANSACTION OF ELECTRON DEVICE, VOL., 35, No. 5, May, 1988, p646–652), the solid-state image pickup element is briefly described below.

In FIG. 3, reference numeral 101 denotes light-receiving elements each of which has a capacity CO for connecting a JFET (junction type field effect transistor) gate and a horizontal address line 103. Reference numeral 102 denotes a source load circuit for the JFET which constitutes each of the light receiving elements 101, the source load forming a source follower together with the JFET of each light-receiving element 101. Reference numeral 103 denotes the horizontal address lines which are respectively subjected to capacity coupling with the JFET gates by the coupling capacity CO for a single horizontal line which forms the light-receiving element 101. Reference numeral 104 denotes a vertical scanning decoder which gives a reset pulse $\phi$VH to the horizontal address line selected by line selection data and an off-pulse $\phi$VL to the horizontal address lines not selected by the line selection data. When the reset pulse $\phi$VH is low, the JFET of each of the light-receiving elements 101 is turned on, and the gate voltage appears on the source. When the reset pulse $\phi$VH is high, the coupling capacity CO of each of the light-receiving elements 101 is charged to a predetermined charge amount, and the potential of each of the light-receiving elements 101 is reset to a predetermined potential. When the off-pulse $\phi$VL is high, the JFET of each of the light-receiving elements 101 is turned on, the gate voltage appears on the source. When the off-pulse $\phi$VL is low, the JFET of each of the light-receiving elements 101 is turned off, and the gate potential does not appear in the output. Reference numeral 105 denotes vertical signal lines each of which is connected to the sources of the light-receiving elements 101 in the same column so that the gate potentials of the light-receiving elements 101 on the line selected by the vertical scanning decoder 104 respectively appear on the vertical signal lines 105. Reference numeral 106 denotes a clamp circuit comprising clamp circuits respectively provided for the vertical signal lines 105 so that the potential of each of the vertical signal lines 105 is fixed at the standard potential VR when a clamp pulse $\phi$c is high. Reference numeral 107 denotes a sample and hold circuit and line memory which comprises hold capacitors and switches respectively provided for the vertical signal lines 105 so that the potential level of each of the vertical signal lines 105 is sampled when $\phi$sh is high, and the potential is held the instant $\phi$sh becomes low. The hold capacitors separated by the vertical signal lines 105 also serve as horizontal line memory devices. Reference numeral 108 denotes an output amplifier for outputting the potential of a horizontal signal line 109. Reference numeral 110 denotes switches each of which connects the signal of the sample and hold circuit and line memory 107 to the horizontal signal line 109 and which are scanned by a horizontal shift register 111.

Figure 4:
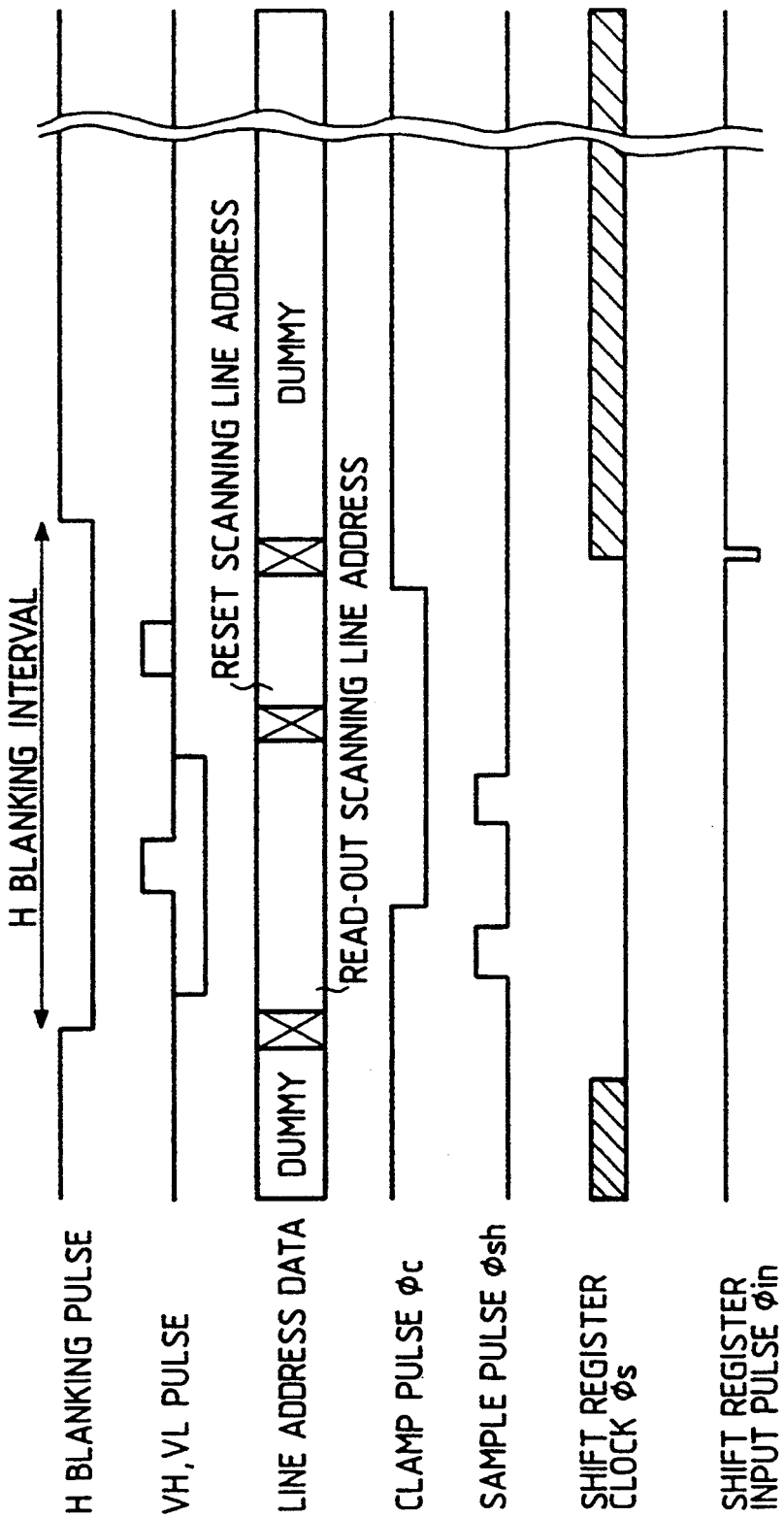
FIG. 4 is a drawing showing the driving timing chart of an FGA solid-state image pickup element.

FIG. 4 shows the driving timing chart of an FGA solid-state image pickup element. Line address data is set immediately after the horizontal blanking interval is started. When the off-pulse $\phi$VL is then put into the low level, the JFET gates of the light-receiving elements on the lines other than the selected line are turned off, and only the signals on the respective selected lines appear on the vertical signal lines 105. The signals appearing are clamped to the standard potential VR by the clamp pulse $\phi$c, and the levels of the signals are then sampled by the sample and hold pulse $\phi$sh. When the clamp pulse $\phi$c then becomes low, and when the reset pulse $\phi$VH then becomes high, the charges of all the light-receiving elements 101 on the selected line are reset, and the output of the vertical signal lines 105 is changed. After the reset pulse $\phi$VH becomes low, the potentials appearing on the vertical signal lines 105 are sampled and held by the sample and hold pulse φsh, whereby potential differences between before and after the light-receiving elements 101 are reset are stored in the sample and hold circuit and line memory 107. The off-pulse φVL is then put into an intermediate potential. The address of a line to be reset for controlling the accumulation period is then set as line address data, and the charges of the light-receiving elements 101 on the specified line are reset when the reset pulse φVH becomes high. After this operation is completed, the clamp pulse is again put into the high level, and the potential of each of the vertical signal lines is clamped. The shift register 111 then starts scanning the line memory 107 at the end of a blanking interval H. Vertical scanning can randomly be made by supplying the line address data. The accumulation period can be set by supplying the address of the line to be reset several H (horizontal scanning) intervals before reading-out, thus leading to the operation of an electronic focal plane shutter.

Figure 5:
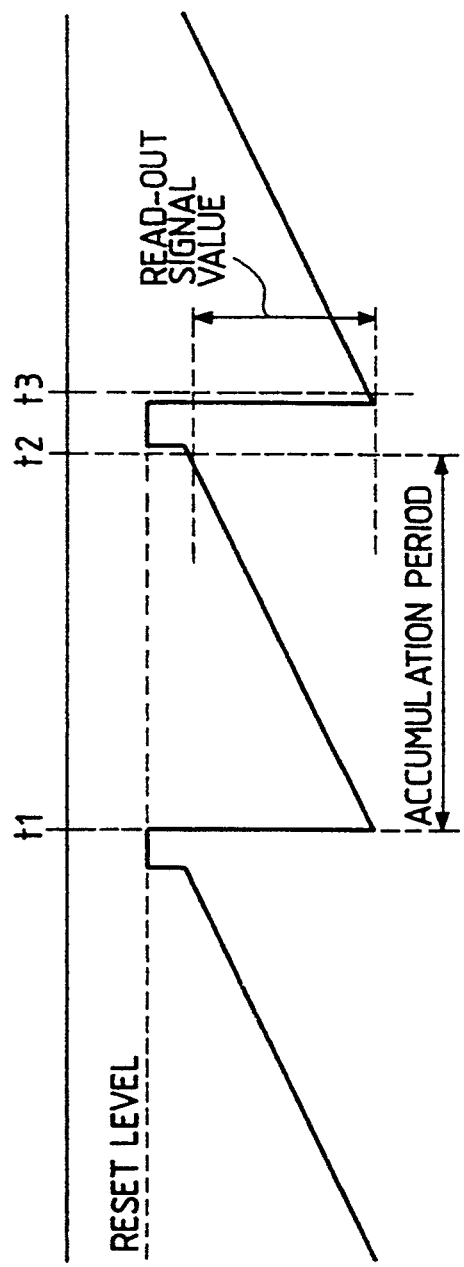
FIG. 5 is a drawing showing changes in the output of a light-receiving element.

FIG. 5 is a drawing showing changes in the output from the light-receiving elements 101. The output is reset by the reset pulse φVH at time t1. If light is applied, the output potential is increased with the passage of time. The potential of the sample and hold circuit and line memory 107 is clamped, at time t2, at the potential immediately before resetting. When the potential immediately after resetting at time t3 is sampled and held, the read-out signal value is obtained.

Figure 6:
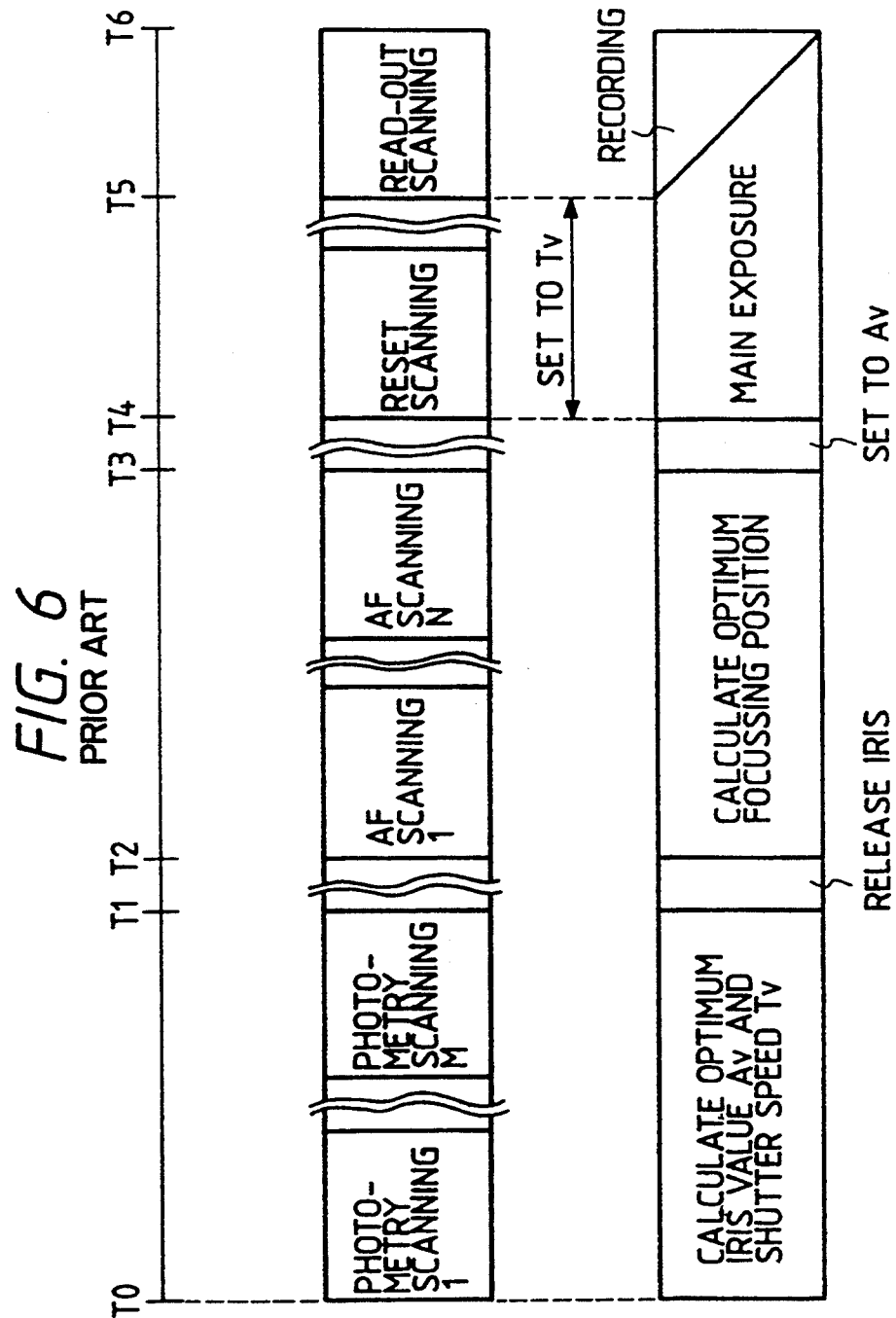
FIG. 6 is a drawing showing the operation sequence of a conventional still video camera with an AF function.

FIG. 6 is a drawing showing the operation sequence of the still video camera with an AF function shown in FIG. 1. In the drawing, when the release switch is turned on at time T0, a photographing sequence is started. The optimum iris value Av and the optimum shutter speed Tv are calculated by the TTL (through the lens) method from the average of the output from the solid-state image pickup element 5, which is obtained by scanning M times, i.e., photometry scanning, with an aperture value between times T0 to T1, while changing the accumulation period. The aperture is set to release between times T1 to T2, and N times of AF scanning are made between times T2 to T3, while changing the focus conditions by moving the lens unit 1 from the focusing position at infinity to the closest focusing position in an N-step or continuous manner using the driving motor 2. The out-of-focus amount is calculated from the output of the solid-state image pickup element 5, which is obtained by N times of scanning, and the position with the smallest out-of-focus amount, i.e., the optimum focusing position, is calculated. The aperture value is set to the value Av between times T3 to T4, and, at the same time, the lens unit 1 is set at the optimum focusing position. The reset scanning is started at time T4 for resetting the charge of a single line during a single horizontal scanning period (referred to as "1 H" hereinafter). The read-out scanning is started at time T5, and at the same time, the processing signals are recorded on the magnetic sheet 15.

Figure 2:
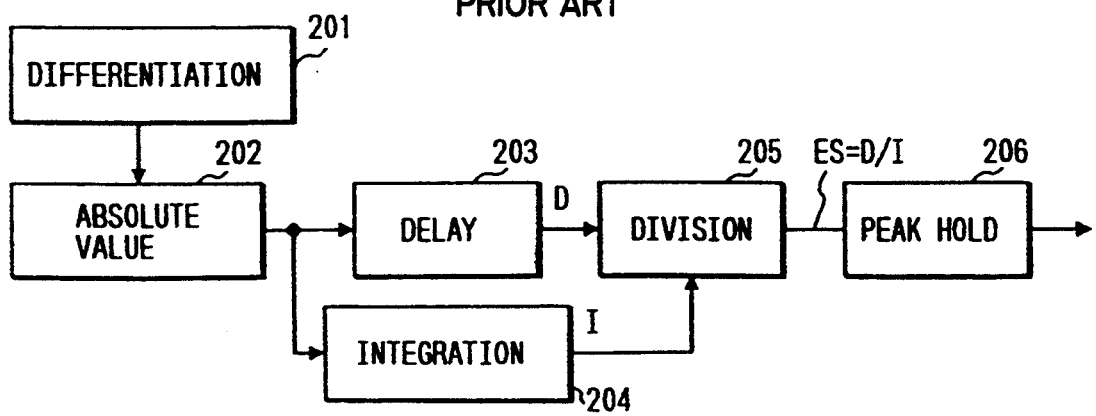
FIG. 2 is a block diagram of an ES filter.

FIGS. 7A to 7F explain the ES method of detecting an out-of-focus amount. Since the ES method is disclosed in U.S. Pat. No. 4,804,831, the ES method is briefly described below. In the drawings, FIG. 7A shows an image signal in which the edge rises quickly when in focus, but slower when in an unfocus state. FIG. 7B shows the absolute value of the differential waveform of the image signal. FIGS. 7C and 7D show delay signals DL1 and DL2, respectively, of the differential waveform D, and FIG. 7E shows the integral waveform I of the image signal which indicates the contrast between the edge portions in focus and unfocus. FIG. 7F shows the ES value which is obtained by dividing D by I and which shows edge sharpness. FIG. 2 is a block diagram showing an example of the arrangement of the ES filter 8. In FIG. 2, reference numeral 201 denotes a differentiation circuit; reference numeral 202, an absolute value circuit; reference numeral 203, a delay circuit; reference numeral 204, an integration circuit; reference numeral 205, a division circuit; and reference numeral 206, a peak hold circuit. It is decided that the highest ES value of the image information is the ES value at the focusing position for a subject.

Figure 8:
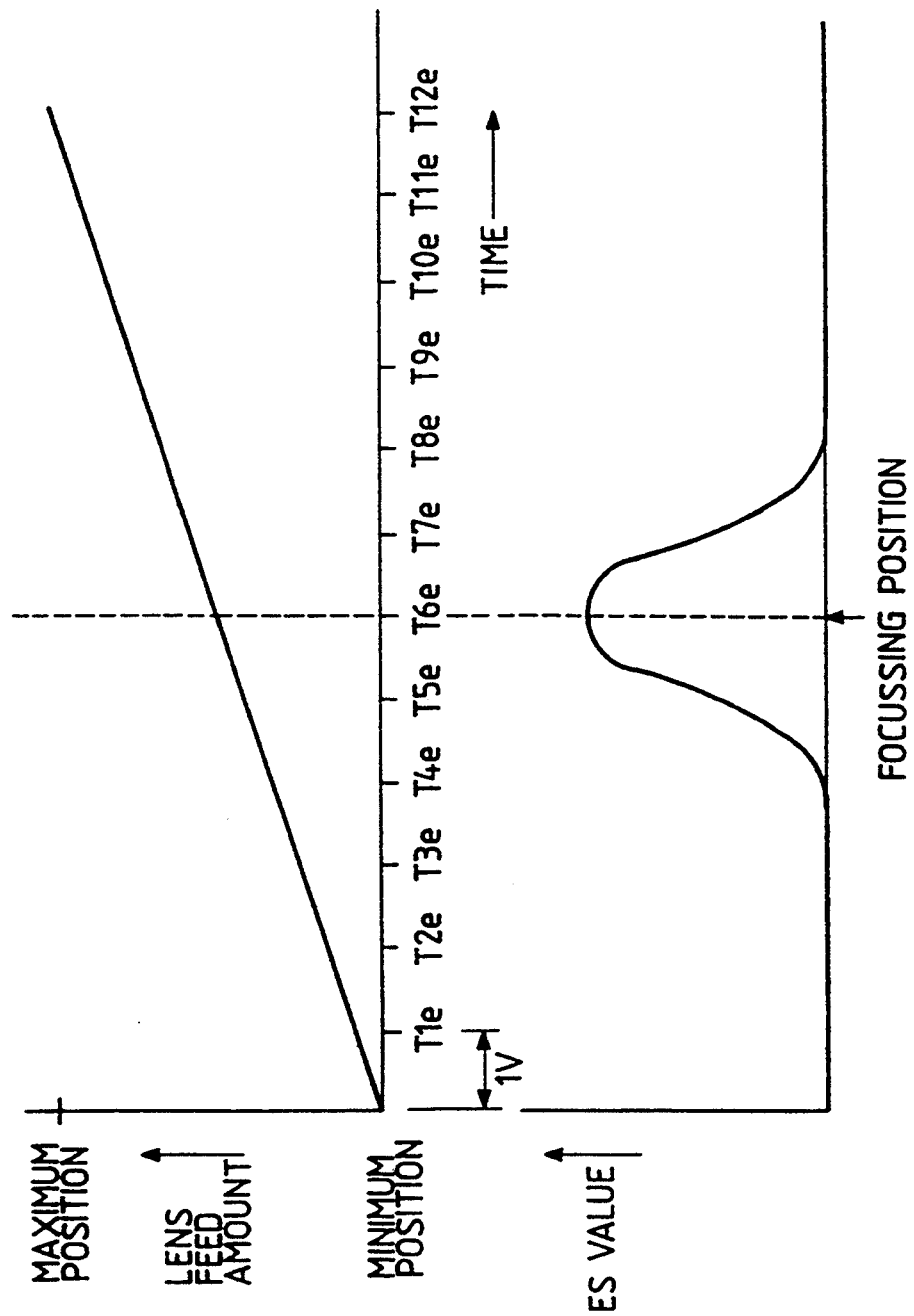
FIG. 8 is a drawing showing changes in the lens position and ES value.

FIG. 8 is a drawing showing changes in the ES value with changes in the lens position during AF scanning for determining the focusing position. In this example, the lens is continuously moved from the minimum position to the maximum position, and, at the same time, the image information is stored in the solid-state image pickup elements 5 at vertical scanning (referred to as "1 V" hereinafter) intervals. The ES values are determined from the image information by scanning the signals thereof, and the position with the highest ES value is considered the focusing position.

Figure 9:
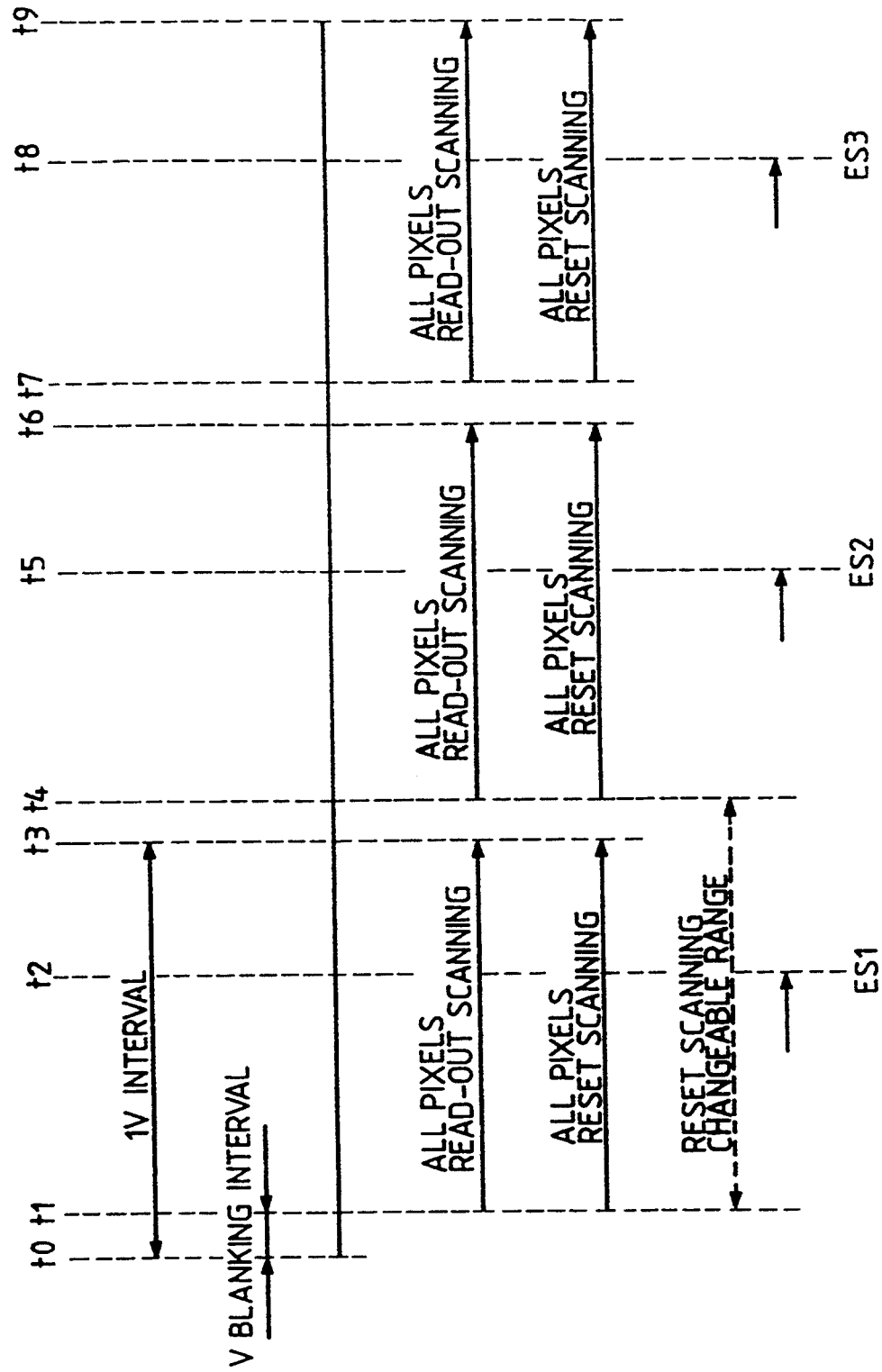
FIG. 9 is a drawing showing a conventional method of driving an image pickup element.

FIG. 9 is a drawing showing the timing in a conventional method of driving the solid-state image pickup element 5 for detecting an out-of-focus amount such as the ES value or the like. As shown in FIG. 9, in the conventional method, read-out scanning and reset scanning of all pixels are simultaneously made after the blanking interval V. In regard to specification of a vertical scanning address, as shown in FIG. 4, the time (which can be set on the unit of the horizontal scanning interval) from designation of a line address of reset scanning to designation of read-out scanning address, both of which are made at every horizontal blanking interval, is the time for accumulating exposure charge. If the address Y of the read-out starting position is set at a time, e.g., time t3, immediately after the blanking interval, the accumulation time is the maximum (1 V interval) when the address Y of the reset scanning start position is set at t1, and the accumulation time is the minimum (zero) when the address Y of the reset scanning start position is set at t3.

As described above, although 12 times of AF scanning are sometimes required for keeping high AF precision, since the conventional driving method requires the 1 V interval for a single AF scanning, a time of about 200 ms is taken until AF scanning is completed, thereby increasing the release time lag. If an attempt is made to decrease the time lag, the number of times of AF scanning must be decreased, which results in a deterioration of the AF precision.

A feature of the present invention achieved for solving the problem is described below.

Figure 10:
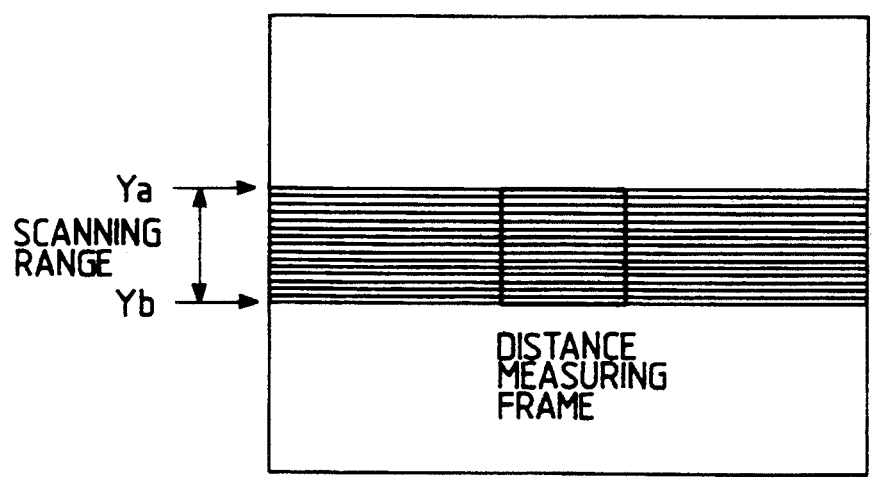
FIG. 10 is a drawing showing an AF scanning range in the first embodiment.

FIG. 10 is a drawing showing the AF scanning range in a still video camera according to a first embodiment of the present invention. FIG. 11 is a drawing showing the AF scanning method in the still video camera. The information in a distance measuring frame provided at the central portion of an image plane is generally used for measuring a distance. The provision of an excessively large distance measuring frame causes problems in that the camera is focussed to a portion on which the photographer does not intend to focus. It is sufficient that the size of the distance measuring frame is about ¼ or less of the whole image plane. During AF scanning, therefore, the purpose of AF scanning can be achieved by scanning only the region in the distance measuring frame. The lines out of the range in the distance measuring frame can be skipped by using a solid-state image pickup element which is capable of designating any desired read-out address in the vertical direction. In this embodiment, assuming that the vertical address at the upper end of the distance measuring frame is Ya, and the vertical address at the lower end of the distance measuring frame is Yb, the AF scanning range is set between the vertical addresses Ya and Yb, as shown in FIG. 10.

This embodiment has the same arrangements of circuits as those shown by the block diagrams in FIGS. 1, 2, 3 except for the method of driving the image pickup element for AF scanning.

FIG. 11 is a drawing showing a method of driving the solid-state image pickup element 5. The reset scanning of the distance measuring frame only is made by successively designating the addresses from Ya to Yb between times t1 and t3 (strictly, 1 H before the time t3). The read-out scanning of the distance measuring frame only is then made by successively designating the addresses from Ya to Yb between times t3 and t4. In this method, the period for accumulating exposure charge is the time from the start of the reset scanning to the start of the read-out scanning. The accumulation period can be changed at 1 H intervals. Similarly, the reset scanning of the range of the distance measuring frame only is made between time t3 and time 1 H before time t6, and the read-out scanning of the range of the distance measuring frame only is made between times t6 and t7. In this way, scanning of the range of the distance measuring frame only takes only about ¼ of the 1 V interval. It is therefore possible to perfor AC scanning at least two times in the 1 V interval, and many times of AF scanning in a short period. The release time lag can thus be decreased, without decreasing the AF precision.

Figure 12:
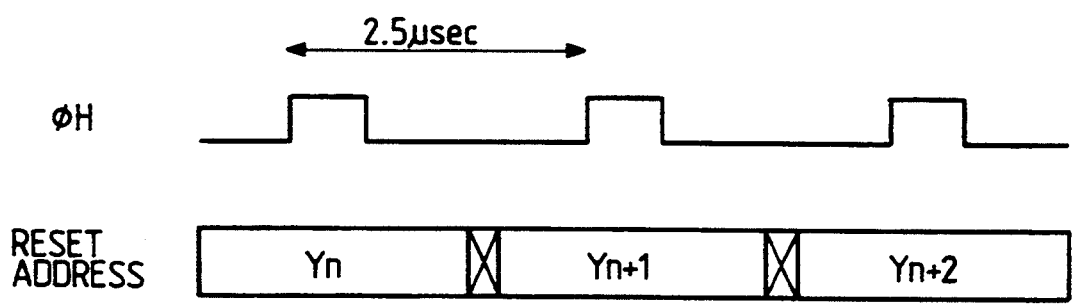
FIG. 12 is a drawing explaining high-speed reset in a second embodiment.

FIG. 12 is a drawing showing a method of reset scanning of the whole image plane at a high speed. If charge is simply destroyed, since desired addresses to be reset are successively set, and a pulse for putting the gates into a high potential is applied, as shown in FIG. 12, the charges of all pixels can be reset at a high speed within a time of about the vertical blanking interval. In the first embodiment, the pixels which are not read out are not at all reset. Under normal conditions, irradiation with strong light causes no problem because excessive charge is discharged by the antiblooming mechanism. However, when blooming is produced by irradiation with very strong light, there is the possibility that the generation of an alias adversely affects the detection of an out-of-focus amount. FIG. 13 is a drawing showing the operation in a modified embodiment in which high-speed reset scanning of all pixels is performed before the reset scanning of the range of the distance measuring frame so as to prevent a problem from occurring even in the above-described case. This modified embodiment is described as a second embodiment of the present invention. In FIG. 13, high-speed reset scanning of all pixels is performed between times t2 and t3 before reset scanning of the lines from Ya to Yb, which is started at time t3. Since the charges of all pixels are periodically reset by the high-speed reset scanning, it is possible to prevent excessive charge accumulation in the lines out of the range of the distance measuring frame thereby preventing the AF precision from deteriorating due to the alias phenomenon even if a subject is exposed to a large quantity of light. In this embodiment, although scanning is performed twice in the 1 V interval, the time required for scanning can be further decreased by decreasing the size of the distance measuring frame, and AF scanning can thus be performed more times. In addition, AF scanning may be performed at scanning intervals unrelated to the vertical scanning interval regardless of the television rate.

Although, in the above embodiments, the focus conditions are changed by driving the lens unit during AF scanning, the present invention is not limited to this. For example, the focus conditions may be changed by driving the image pickup element.

As described above, since the present invention permits AF scanning information to be obtained many times for a short period, it is possible to increase the AF precision and minimize release time lag. It is also possible to prevent error from occurring due to blooming.

What is claimed is:

1. An automatic focus adjusting apparatus, comprising:
    an image pickup device, wherein a desired area of an image pickup plane of said image pickup device can be selectively scanned;
    read-out means for selectively scanning and reading out only lines in a focus detecting area set in said image pickup plane;
    reset means capable of resetting the lines of the focus detecting area to be read out by said read-out means; and
    focus detecting means for causing said read-out means to read out the lines in the focus detecting area after the lines in the focus detecting area are reset by said reset means, and for detecting focus on the basis of an image signal based on the output of said read-out means.

2. An apparatus according to claim 1, wherein said image pickup device comprises a floating gate array device.

3. An apparatus according to claim 1, wherein said reset means can perform a reset operation a plurality of times in one field period, and wherein said read-out means can perform a read-out operation a plurality of times in one field period.

4. An apparatus according to claim 1, wherein said read-out means performs a charge accumulation operation for a predetermined time after charge in the focus detecting area is reset by said reset means, and reads out the charge accumulated for the predetermined time to detect focus.

5. An apparatus according to claim 4, wherein said focus detecting means includes focus signal extraction means for extracting a predetermined focus signal, which varies according to the focus state, from an output signal read out by said read-out means and drives a focus lens so as to maximize the level of the focus signal.

6. An apparatus according to claim 5, wherein said predetermined focus signal includes information indicating an edge width of an object.

7. An apparatus according to claim 1, further comprising:
    an iris for adjusting an amount of light incident on said image pickup device;
    a shutter for controlling an accumulation time of said image pickup device; and exposure control means for controlling said iris and said shutter so that said image pickup device outputs an image pick-up signal of a suitable level.

8. An apparatus according to claim 7, further comprising:
control means for driving said exposure control means to cause said exposure control means to perform an exposure control operation, and thereafter for driving said focus detecting means to cause said focus detecting means to perform a focus adjustment operation.

9. An apparatus according to claim 8, wherein the focus adjustment operation is an operation in which a read-out operation of said read-out means is performed a plurality of times in one field period and focus is detected from outputs of the plurality of read-out operations of said read-out means.

10. An apparatus according to claim 9, wherein the focus adjustment operation is performed before an image pickup operation, and further comprising recording means for recording an output signal of said image pickup elements after the focus adjustment operation is performed.

11. A focus adjusting apparatus for changing focus conditions and detecting and minimizing image blur by using signals read out from scanning lines of a focus detecting area of an image pickup plane including image pickup elements, a plurality of times, comprising:
reset scanning means for resetting only the scanning lines within the focus detecting area;
read scanning means for accessing and reading out the scanning lines reset by said reset scanning means after a predetermined time has passed following reset; and
focus detecting means for detecting a focus state on the basis of the output from said read scanning means.

12. A focus adjusting apparatus according to claim 2, further comprising further reset means for resetting all scanning lines before reset by said reset scanning means.

13. An apparatus according to claim 11, wherein said reset means can perform a reset operation a plurality of times in one field period, and wherein said read scanning means can perform a read-out operation a plurality of times in one field period.

14. An apparatus according to claim 13, wherein said focus detecting means includes focus signal extraction means for extracting a predetermined focus signal, which varies according to the focus state, from an output signal read out by said read scanning means and drives a focus lens so as to maximize the level of the focus signal.

15. An apparatus according to claim 5, wherein the predetermined focus signal includes information indicating an edge width of an object.

16. An apparatus according to claim 11, further comprising:
an iris for adjusting an amount of light incident on said image pickup elements;
a shutter for controlling an accumulation time of said image pickup elements; and
exposure control means for controlling said iris and said shutter so that said image pickup elements output an image pickup signal of a suitable level.

17. An apparatus according to claim 16, further comprising;
control means for driving said exposure control means to cause said exposure control means to perform an exposure control operation, and thereafter for driving said focus detecting means to cause said focus detecting means to perform a focus adjustment operation.

18. An apparatus according to claim 17, wherein said control means causes said iris to open when said control means drives said focus detecting means to perform the focus adjustment operation.

19. An apparatus according to claim 18, wherein the focus adjustment operation is an operation in which a read-out operation of said read scanning means is performed a plurality of times in one field period and the focus state is detected from outputs of the plurality of read-out operations of said read scanning means.

20. An apparatus according to claim 19, wherein the focus adjustment operation is performed while driving the focus lens.

21. An apparatus according to claim 17, wherein the focus adjustment operation is performed before an image pickup operation, and further comprising recording means for recording an output signal of said image pickup elements after the focus adjustment operation is performed.

22. An apparatus according to claim 21, wherein said recording means records still image information.

23. A video camera, comprising:
image pickup elements for photoelectrically converting light focused on an image pickup plane, and for outputting an image pickup signal;
read-out means operable in both a first read-out mode in which charge in a detection area set at a predetermined position of said image pickup plane is read out and a second read-out mode in which charge in the entire image pickup plane is read out;
reset means operable in both a first reset mode in which the charge in the detection area is reset and a second reset mode in which the charge in the entire image pickup plane is reset; and
recording means for causing said reset means to operate in the first reset mode to reset the charge of the detection area, for performing a predetermined preprocessing by causing said read-out means to operate in the first read-out mode to read out the charge in the detection area after a predetermined time from completion of the reset of the charge in the detection area, for causing said reset means to operate in the second reset mode to reset the charge in the entire image pickup plane after the preprocessing is completed, and for recording information of the entire image pickup plane on a recording medium by causing said read-out means to operate in the second read-out mode after the reset of charge in the entire image pickup plane is completed.

24. A video camera according to claim 23, wherein said reset means can perform a reset operation in the first reset mode a plurality of times during one field period, and wherein said read-out means can perform a read-out operation in the first read-out mode a plurality of times during one field period.

25. A video camera according to claim 24, further comprising focus detecting means for detecting a focus state based on an output from said read-out means.

26. A video camera according to claim 25, wherein the detection area is a focus detection area, wherein said focus detecting means includes focus signal extraction means for extracting a predetermined focus signal, which varies according to the focus state, from an output signal read out by said read-out means, and wherein said focus detecting means drives a focus lens so as to maximize the level of the focus signal.

27. A video camera according to claim 26, further comprising:
   an iris for adjusting an amount of light incident on said image pickup elements;
   a shutter for controlling an accumulation time of said image pickup elements; and
   exposure control means for controlling said iris and said shutter so that said image pickup elements output an image pick-up signal of a suitable level.

28. An apparatus according to claim 27, further comprising:
   control means for driving said exposure control means to cause said exposure control means to perform an exposure control operation, and thereafter for driving said focus detecting means to cause said focus detecting means to perform a focus adjustment operation.

29. An apparatus according to claim 28, wherein the focus adjustment operation is performed before an image pickup operation, and wherein an output signal of said image pickup elements is recorded on the recording medium after the focus adjustment operation is performed.

* * * * *

UNITED STATES PATENT AND TRADEMARK OFFICE
CERTIFICATE OF CORRECTION

PATENT NO. : 5,363,137
DATED : November 8, 1994
INVENTOR(S) : Akira SUGA et al.

Page 1 of 3

It is certified that error appears in the above-indentified patent and that said Letters Patent is hereby corrected as shown below:

On the title page:

> Item [57], in the "ABSTRACT":
>
> Line 3, "pick up" should read --pickup--.
>
> Line 7, "high-speed" should read --high speed--.

SHEET 5

> Figure 6, "FOCUSSING" should read --FOCUSING--.

SHEET 6

> Figure 7A, "FOCUSSING" should read --FOCUSING--.
> Figure 7A, "UNFOCUSSING" should read --UNFOCUSING--.

SHEET 7

> Figure 8, "FOCUSSING" should read --FOCUSING--.

COLUMN 1

> Line 22, "infrared" should read --infrared ray--.
> Line 49, "referred" should read --(referred--.
> Line 50, "necessary;" should read --necessary--.
> Line 53, "scanning" should read --scanning are--.
> Line 55, "a about" should read --a time of about--.
> Line 60, "crease AF" should read --crease in AF--.

UNITED STATES PATENT AND TRADEMARK OFFICE
CERTIFICATE OF CORRECTION

PATENT NO. : 5,363,137

DATED : November 8, 1994

INVENTOR(S) : Akira SUGA et al.

It is certified that error appears in the above-indentified patent and that said Letters Patent is hereby corrected as shown below:

COLUMN 2

Line 33, "reversal" should read --several--.

COLUMN 3

Line 17, "embodiment." should read --the drawings.--.

COLUMN 6

Line 66, "focussed" should read --focused--.

COLUMN 7

Line 36, "perfor AC" should read --perform AF--.
    Line 37, "of AF scan-" should be deleted.
    Line 38, "ning" should be deleted.
    Line 50, "antiblooming" should read --anti-blooming--.
    Line 67, "frame" should read --frame,--.

UNITED STATES PATENT AND TRADEMARK OFFICE
CERTIFICATE OF CORRECTION

PATENT NO. : 5,363,137
DATED : November 8, 1994
INVENTOR(S) : Akira Suga, et al.

It is certified that error appears in the above-indentified patent and that said Letters Patent is hereby corrected as shown below:

COLUMN 9

Line 38, "claim 2," should read --claim 11,--.
Line 53, "claim 5" should read --claim 14,--.

Signed and Sealed this

Thirtieth Day of May, 1995

*Attest:*

BRUCE LEHMAN

*Attesting Officer*   *Commissioner of Patents and Trademarks*